US007197477B2

(12) United States Patent
Merten et al.

(10) Patent No.: US 7,197,477 B2
(45) Date of Patent: Mar. 27, 2007

(54) SYSTEM FOR SELLING SUBSCRIPTIONS TO PERIODICALS USING SUBSCRIPTION GIFTCARDS

(75) Inventors: Laura Merten, Deerfield, IL (US); Michael Bleser, Deerfield, IL (US)

(73) Assignee: Walgreen Co., Deerfield, IL (US)

( * ) Notice: Subject to any disclaimer, the term of this patent is extended or adjusted under 35 U.S.C. 154(b) by 616 days.

(21) Appl. No.: 10/375,426

(22) Filed: Feb. 27, 2003

(65) Prior Publication Data
US 2003/0163389 A1 Aug. 28, 2003

Related U.S. Application Data

(60) Provisional application No. 60/360,349, filed on Feb. 27, 2002.

(51) Int. Cl.
G06Q 30/00 (2006.01)
G06F 17/30 (2006.01)

(52) U.S. Cl. .......................................... 705/26; 705/27
(58) Field of Classification Search .................. 705/26, 705/27
See application file for complete search history.

(56) References Cited

U.S. PATENT DOCUMENTS

| 5,926,796 | A | 7/1999 | Walker et al. | |
| 6,470,322 | B1 * | 10/2002 | Walker et al. | 705/16 |
| 2002/0046341 | A1 * | 4/2002 | Kazaks et al. | 713/182 |
| 2002/0174016 | A1 * | 11/2002 | Cuervo | 705/16 |
| 2003/0083935 | A1 * | 5/2003 | Dickson | 705/14 |

FOREIGN PATENT DOCUMENTS

JP 20022083237 A * 6/2001

OTHER PUBLICATIONS

"Thinking of giving subscription gifts? Do some studying," William F. Powers, The Washington Post, The Commercial Appeal, Memphis, Tenn., Dec. 17, 1995, p. G.2.*

* cited by examiner

Primary Examiner—Matthew S. Gart
(74) Attorney, Agent, or Firm—Marshall, Gerstein & Borun LLP

(57) ABSTRACT

A periodical subscription order system may be used to provide a customized order vehicle for a consumer to purchase a variety of subscriptions from a publisher. A customer may purchase, at a retail location, a giftcard from a point of sale terminal, wherein the giftcard is provided with an identification number. The giftcard may be pre-produced with a specified credit value, or may be purchased for any desired value and may contain storage components for storing the purchased credit value. Information regarding the sale of the giftcard, including the identification number and the credit value may be forwarded to a central system operated by a publisher. The consumer may then be provided with an interface to provide the publisher with the giftcard identification number and to select a periodical subscription from a plurality of subscription options. The publisher may then fulfill the subscription request after determining the validity of the provided giftcard identification number.

14 Claims, 5 Drawing Sheets

SYSTEM FOR SELLING SUBSCRIPTIONS TO PERIODICALS USING SUBSCRIPTION GIFTCARDS

CROSS REFERENCE TO RELATED APPLICATION

This application is a non-provisional application claiming priority from Provisional Application Ser. No. 60/360,349, entitled "Method and System For Selling Subscriptions To Periodicals Using Customized Subscription Giftcards" filed Feb. 27, 2002.

TECHNICAL FIELD

The present invention relates generally to a system for selling subscriptions to periodicals in retail stores using subscription giftcards such as, for example, publisher specific, customized cards which allow the purchaser to activate the subscription via a customer service telephone number, customer service Internet web page, or mail-in form.

BACKGROUND

Subscriptions to periodicals have traditionally been sold using direct mail, telemarketing, and with the use of "blow-in" or "bind-in" cards enclosed in copies of a magazine which are filled in by the consumer and mailed back to the publisher. Publishers place blow-in subscription cards by loosely inserting the cards into periodicals, such as magazines, by air injection. Publishers insert bind-in cards into the periodicals by, for example, binding subscription cards into issues during the printing process. The typical methods of acquiring a subscription to a periodical require a customer to complete one of the enclosed cards and send the completed card and a payment to the publisher. Furthermore, the consumer is typically required to complete a card for each periodical they wish to subscribe to, regardless of whether they are issued by the same publisher.

The initiation of a subscription based upon the typical method of completing one of the enclosed cards and sending the completed card and a payment to the publisher, requires a great deal of time and patience on the part of the consumer as the subscription request is processed. Moreover, this method may be viewed by some as having certain inefficiencies, as it relies upon many different factors outside the control of the publisher, including the consumer remembering to complete and mail the subscription card, the post office successfully delivering the request, the correct processing of the request by the publisher, and the successful completion of payment, either through a credit instrument, or through a "bill me" option. All of these factors lead to lost sales for the publisher as well as a retailer since a consumer is unlikely to purchase a periodical from a retailer while the subscription is being processed. Furthermore, it may be months before the publisher realizes any payment for the requested subscription.

One attempt at creating a method of selling subscriptions to specific periodicals in a retail environment is described in Walker et al., U.S. Pat. No. 5,926,796 ("Walker"). Walker generally discloses a method and apparatus for generating subscription sales at a point-of-sale (POS) terminal at the time the consumer purchases a single issue periodical from the retailer. In the Walker system, a consumer wishing to purchase a magazine, first selects a magazine from the retail display and transacts business with the retailer at a POS terminal. The clerk scans the UPC symbol into the POS terminal and the POS terminal recognizes that the magazine is available for a subscription price. The clerk asks the consumer if they would like to initiate a subscription to that periodical, and if so, the customer completes a subscription card which is returned to the clerk for data entry. The consumer pays for the subscription with any payment means including, for example, cash, debit/credit card, or check. The transaction is then completed with the publisher being informed of the subscription, and the consumer receiving the purchased magazine as the first magazine of the subscription, and at the discounted subscription price. If the consumer wishes to purchase another magazine subscription, they must complete another transaction, even if the magazines are produced by the same publisher.

Consumers, however, have grown accustomed to the ease of purchasing retail level gift certificates, wherein the consumer is able to prepay for merchandise and still maintain the ability to choose from the entire stock of retail goods available. One example of this is gift certificate cards, or giftcards, which have recently gained in popularity as an alternative to traditional paper gift certificates. Giftcards are typically provided in a form similar to that of credit cards. Accordingly, a typical giftcard includes a rectangular plastic body having a strip for magnetically storing information. The giftcard is redeemable for merchandise or services provided by the retailer that issued the giftcard.

Giftcards are typically in an inactive state until purchased. When the giftcard is purchased, it is typically swiped through a card reader which reads the information stored on the giftcard and forwards the information to the retailer's computer center. The computer center, in turn, forwards information to a giftcard processor, which may be provided by the retailer or, more typically, an outside party, thereby activating the giftcard. The giftcard may then be used at a store of the retailer.

DETAILED DESCRIPTION

Figure 1:
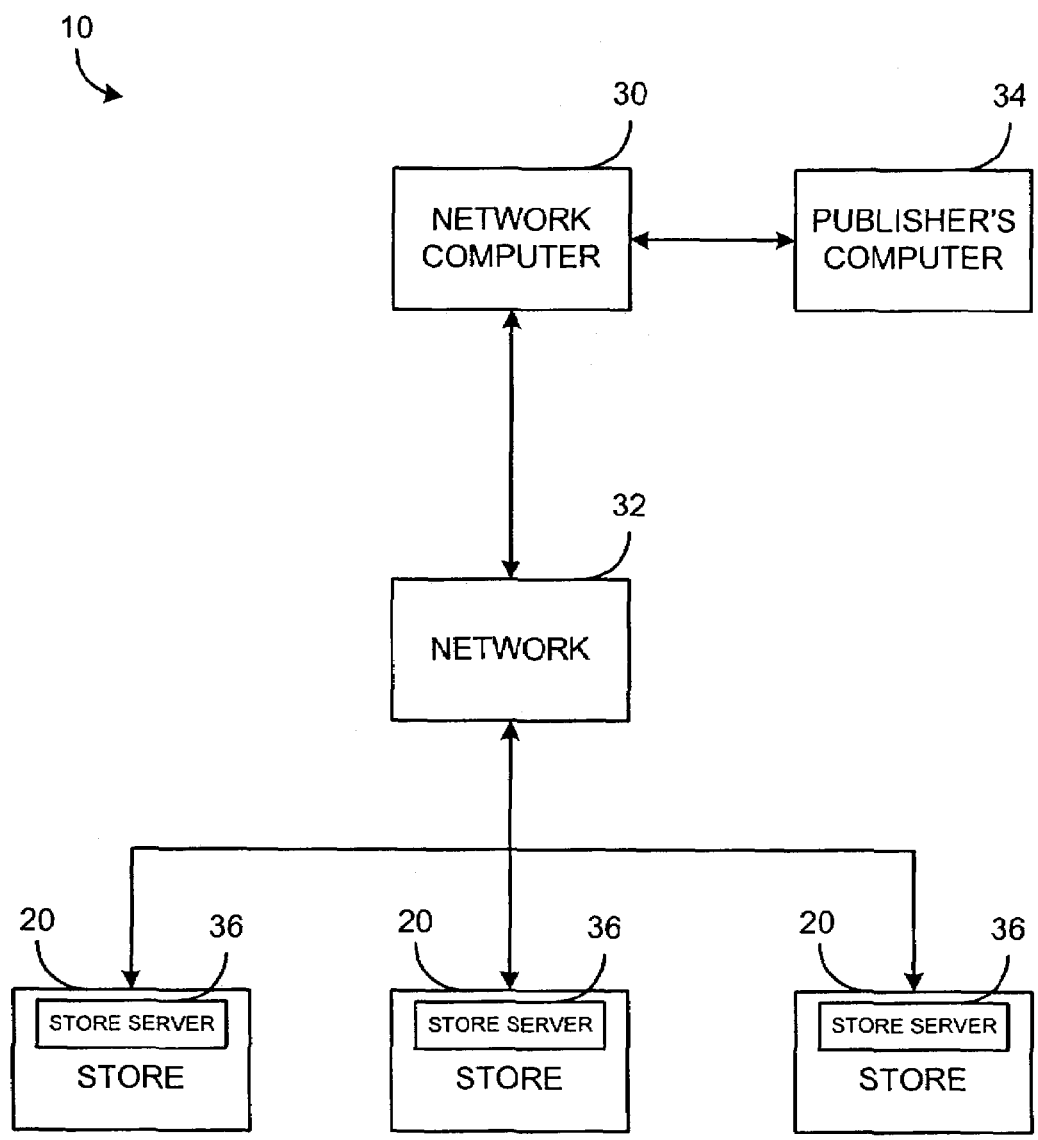
FIG. 1 is a block diagram of an embodiment of an intelligent network system in accordance with the invention.

FIG. 1 illustrates an embodiment of a data network 10 in accordance with the invention. Referring to FIG. 1, the data network 10 may include a first group of stores or facilities 20 operatively coupled to a network computer 30 via a network 32. The plurality of stores 20 may be located, by way of example rather than limitation, in separate geographic locations from each other, in different areas of the same city, or in different states. The network computer 30 may be connected to a publisher's computer 34 via the network 32. The network 32 may be provided using a wide variety of techniques well known to those of ordinary skill in the art for the transfer of electronic data. For example, the network 32 may comprise dedicated access lines, plain, ordinary telephone lines, satellite links, combinations of these, etc. Additionally, the network 32 may include a plurality of network computers or server computers (not shown), each of which may be operatively interconnected in a known manner. Where the network 32 comprises the Internet, data communication may take place over the network 32 via an Internet communication protocol.

The network computer 30 may be a server computer of the type commonly employed in networking solutions. The network computer 30 may be used to accumulate, analyze, and download data relating to the operation of the stores 20 and more particularly to the sale of periodical subscriptions within the stores 20. For example, the network computer 30 may periodically receive data from each of the stores 20 indicative of the sales of periodical subscriptions and reference numbers associated with each of the subscription sales made at the stores 20. This information may be accumulated and periodically transferred to the publisher's computer 34 via the network 32. The stores 20 may include one or more store servers 36 that may be utilized to store customized subscription deals and subscription sales data that includes reference numbers associated with the subscription sales.

Although the data network 10 is shown to include one network computer 30, one publisher's computer 34, and three stores 20, it should be understood that different numbers of computers and stores may be utilized. For example, the network 32 may include a plurality of network computers 30, a plurality of publisher's computers 34, and hundreds or thousands of stores 20, all of which may be interconnected via the network 32. According to the disclosed example, this configuration may provide several advantages, such as, for example, enabling near real time uploads and downloads of information as well as periodic uploads and downloads of information. This provides for a primary backup of all the valuable subscription sales information.

Figure 2:
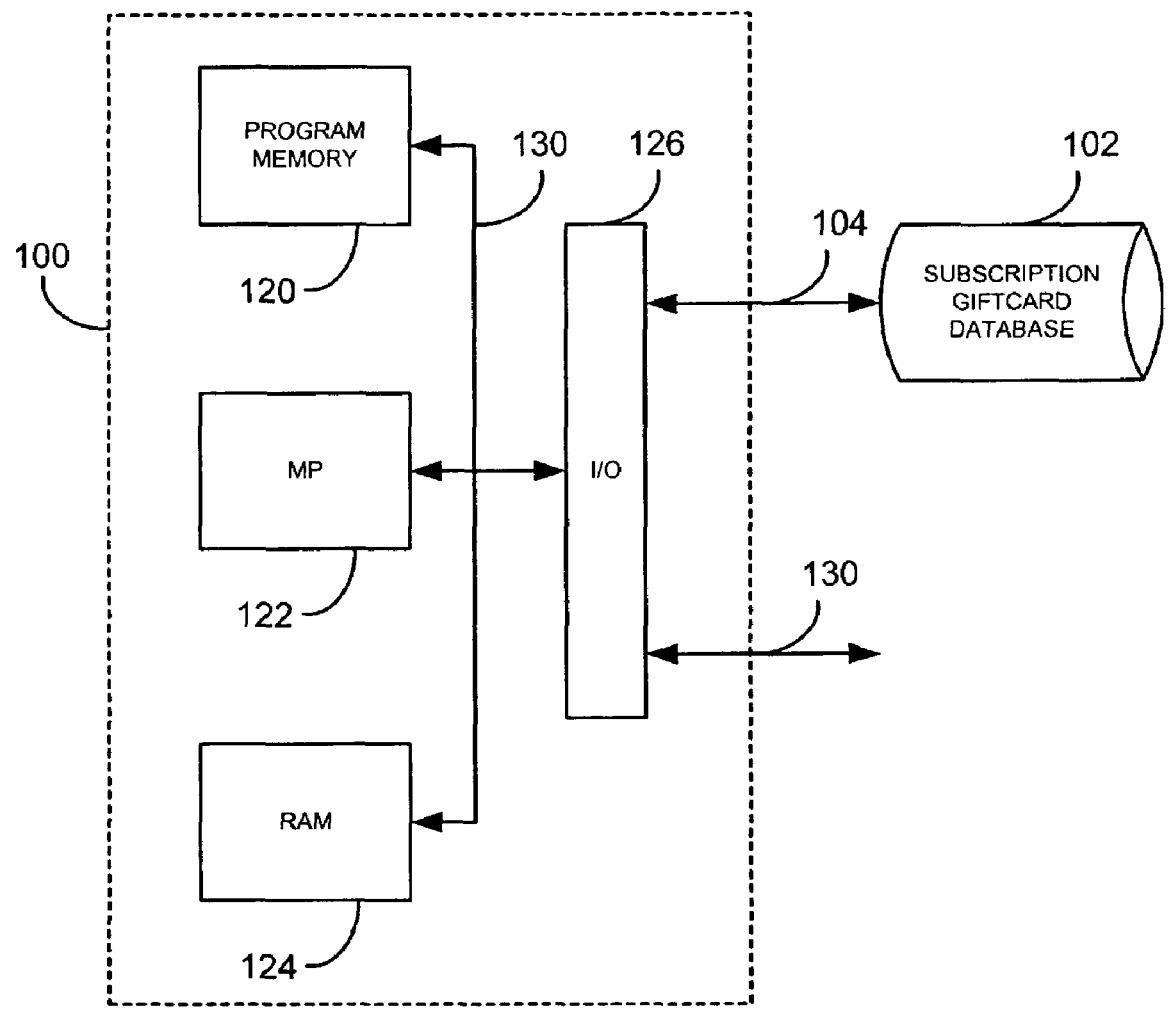
FIG. 2 is a schematic diagram of some of the components of the network computer shown in FIG. 1.

FIG. 2 is a schematic diagram of one possible embodiment of the network computer 30 shown in FIG. 1. The network computer 30 may have a controller 100 that is operatively connected to a subscription giftcard database 102 via link 104. While not shown, additional databases may also be linked to the controller 100 as required in a known manner.

The controller 100 may include a program memory 120, a microcontroller or a microprocessor (MP) 122, a random-access memory (RAM) 124, and an input/output (I/O) circuit 126, all of which may be interconnected via an address/data bus 130. It should be appreciated that although only one microprocessor 122 is shown, the controller 100 may include multiple microprocessors 122. Similarly, the memory of the controller 100 may include multiple RAMs 124 and multiple program memories 120. Although the I/O circuit 126 is shown as a single block, it should be appreciated that the I/O circuit 126 may include a number of different types of I/O circuits. The RAM(s) 124 and programs memories 120 may be implemented as semiconductor memories, magnetically readable memories, and/or optically readable memories, for example. The controller 100 may also be operatively connected to the network 32 via a link 130.

Figure 3:
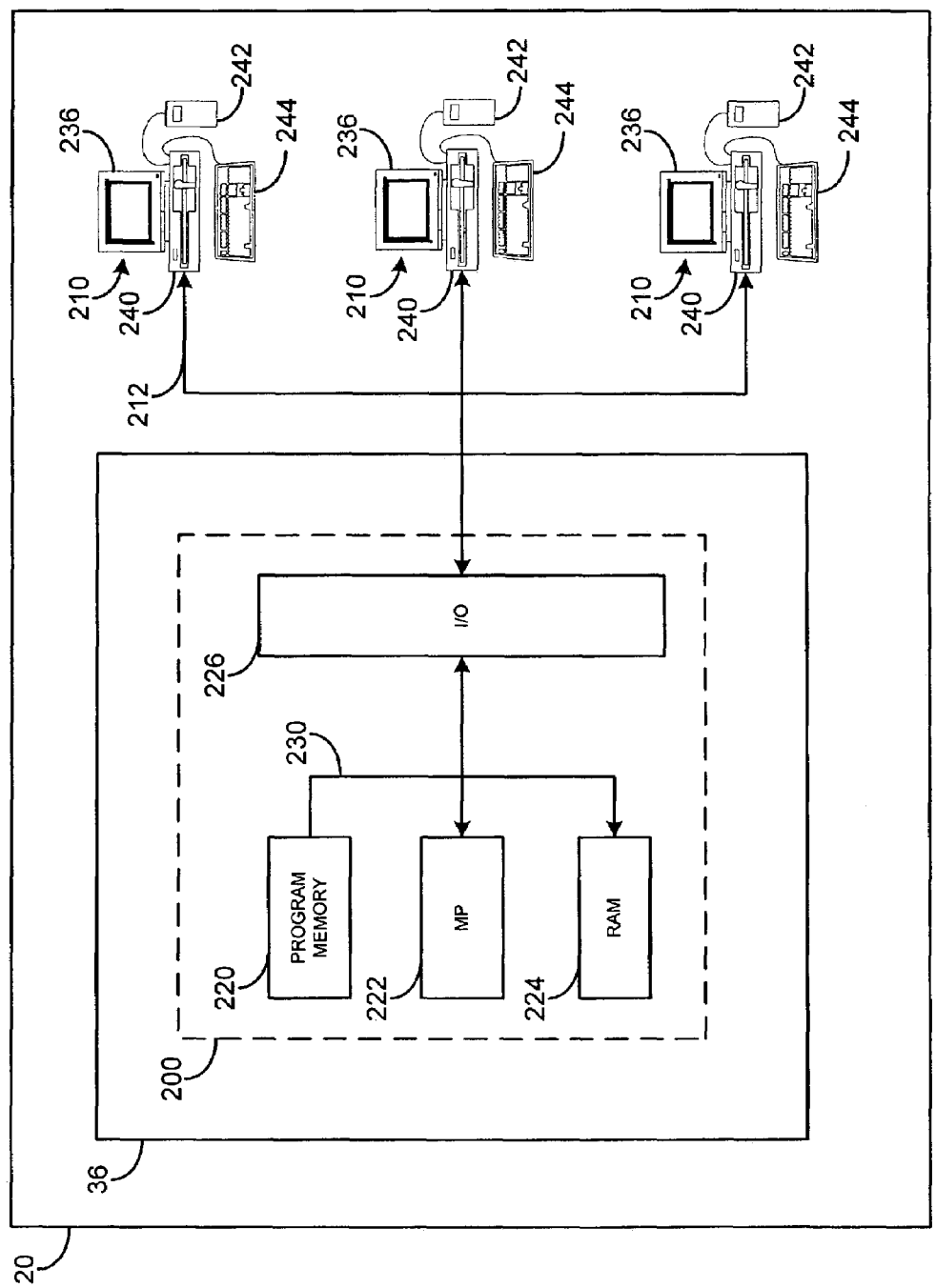
FIG. 3 is a schematic diagram of an embodiment of one of the facilities shown schematically in FIG. 1.

FIG. 3 is a schematic diagram of one possible embodiment of several components located in one or more of the stores 20 from FIG. 1. Although the following description addresses the design of the stores 20, it should be understood that the design of one or more of the stores 20 may be different than the design of other stores 20. Also, each store 20 may have various different structures and methods of operation. It should also be understood that the embodiment shown in FIG. 3 illustrates some of the data connections present in a retail section of a store, however it does not illustrate all of the data connections present in a typical store (i.e. a pharmacy department). For exemplary purposes, various designs of the stores are described below, but it should be understood that numerous other designs may be utilized.

The store 20 may have a store server 36, which includes a controller 200, wherein the store server 36 is operatively connected to a plurality of point-of-sale (POS) terminals 210 via a network 212. The network 212 may be a wide area network (WAN), a local area network (LAN), or any other type of network readily known to those persons of ordinary skill in the art. The POS terminals 210 may also be operatively connected to the network computer 30 from FIG. 1 via the network 32.

Similar to the controller 100 from FIG. 2, the controller 200 may include a program memory 220, a microcontroller or a microprocessor (MP) 222, a random-access memory (RAM) 224, and an input/output (I/O) circuit 226, all of which may be interconnected via an address/data bus 230. As discussed with reference to the controller 100, it should be appreciated that although only one microprocessor 222 is shown, the controller 200 may include multiple microprocessors 222. Similarly, the memory of the controller 200 may include multiple RAMs 224 and multiple programs memories 220. Although the I/O circuit 226 is shown as a single block, the I/O circuit 226 may include a number of different types of I/O circuits. The RAM(s) 224 and programs memories 220 may also be implemented as semiconductor memories, magnetically readable memories, and/or optically readable memories, for example.

The POS terminals 210 may include a display 236, a controller 240, a printer 242, a keyboard 244 as well as a variety of other input/output devices such as a mouse, card reader, touch screen, track pad, track ball, isopoint, scanner, voice recognition system, etc. Each POS terminal 210 may be signed onto and occupied by a store employee to assist them in performing their duties. Store employees may sign onto a POS terminal 210 using any generically available technique, such as entering a user name and password. If a store employee is required to sign onto a POS terminal 210, this information may be passed via the link 212 to the store server 36, so that the controller 200 will be able to identify which store employees are signed onto the system and which POS terminal 210 the employees are signed onto. This may be useful in gathering and monitoring helpful sales information.

Typically, store servers 36 store a plurality of files, programs, and other data for use by the POS terminals 210 and the network computer 30. One store server 36 may handle requests for subscription data from a large number of POS terminals 210. Accordingly, each store server 36 may typically comprise a high end computer with a large storage capacity, one or more fast microprocessors, and one or more high speed network connections. Conversely, relative to a typical store server 36, each POS terminal 210 may typically include less storage capacity, a single microprocessor, and a single network connection.

Overall Operation of the System

One manner in which an exemplary system may operate is described below in connection with a number of flow charts which represent a number of portions or routines of one or more computer programs. These computer program portions may be stored in one or more of the memories in the controllers 100 and 200, and may be written at any high level language such as C, C+, C++, or the like, or any low-level, assembly or machine language. By storing the computer program portions therein, various portions of the memories are physically and/or structurally configured in accordance with the computer program instructions.

Figure 4:
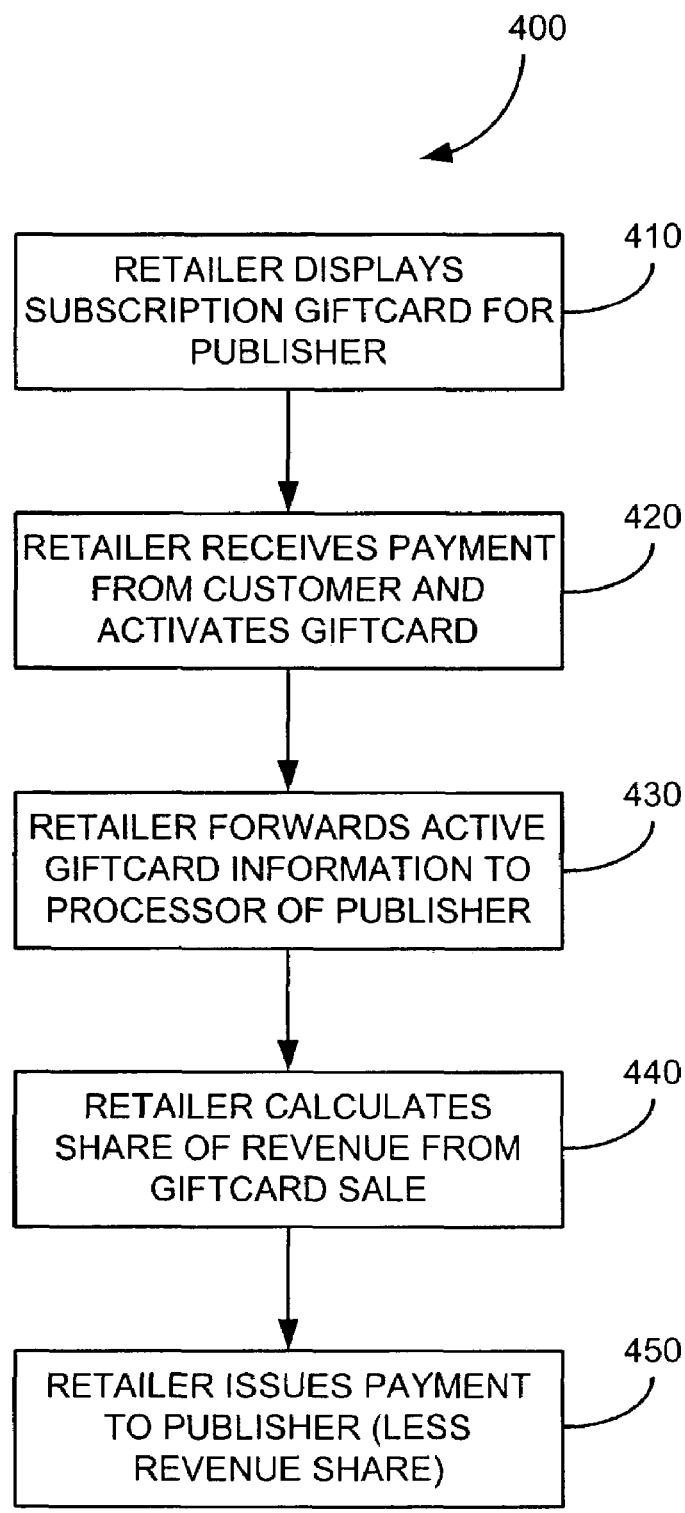
FIG. 4 is a flowchart of steps followed during a subscription giftcard sale in accordance with the teachings of the present invention.
Figure 5:
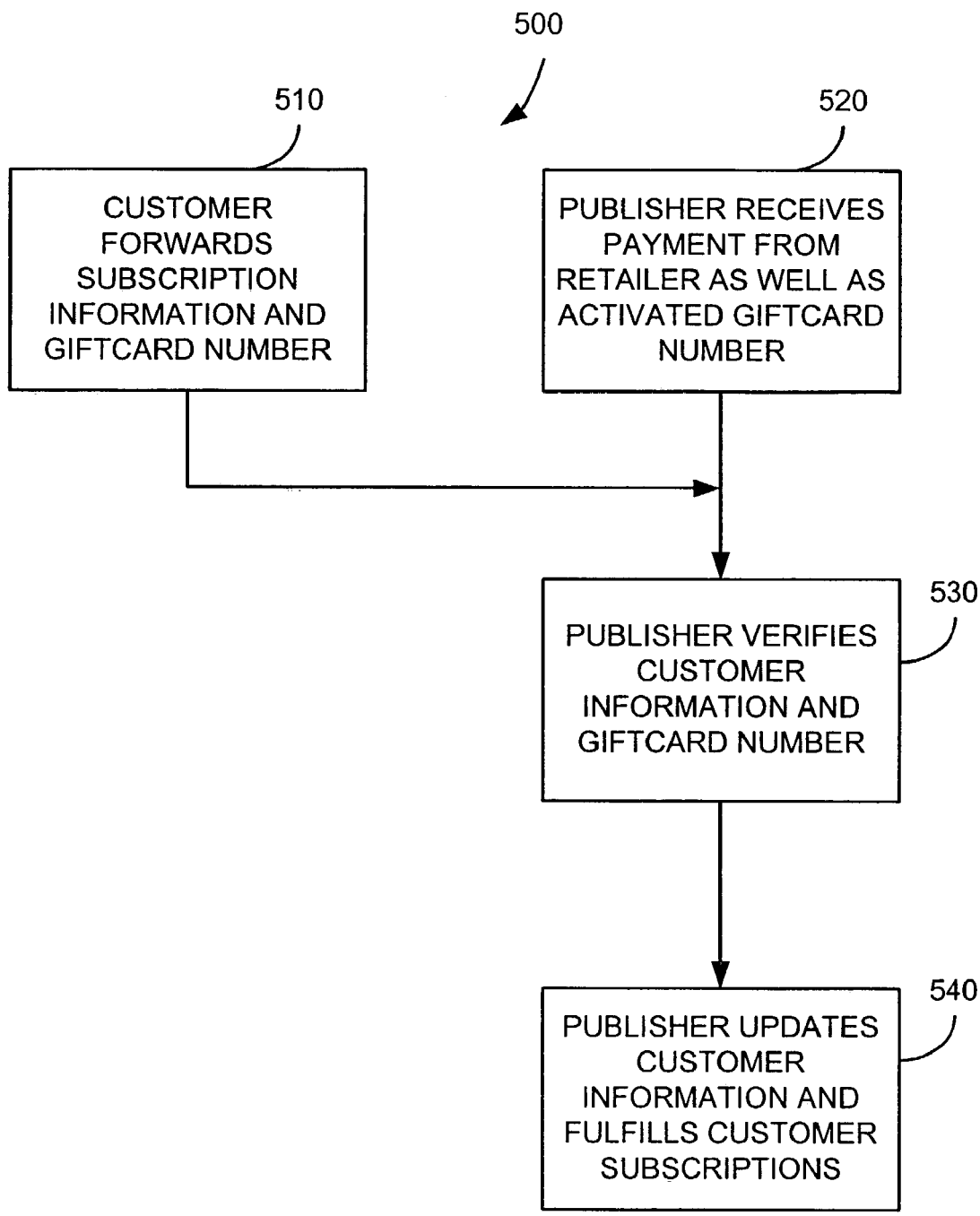
FIG. 5 is a flowchart of some of the steps performed in fulfilling a subscription to a periodical.

FIGS. 4 and 5 are flow charts of two main operating routines 400 and 500 that may be stored in the memory of the controllers 100 and 200. The two main routines 400 and 500 may be utilized in a system for selling subscriptions to periodicals in retail stores using subscription giftcards such as publisher specific offers. As explained below, the flowchart also includes some steps that are performed independent of the controllers 100 and 200.

One method according to the present invention generally relates to the sale of a subscription giftcard at a store location of a retailer, which is usable at a publisher to choose specific subscriptions to periodicals. As used herein, the term "giftcard" is intended to include all types of devices, such as cards, certificates and other documents capable of denoting, and possibly storing a credit value. This definition includes conventional credit card style giftcards, on which information may be stored, phone cards, and smart cards, which may store, process, and update information, among other storage media.

In the currently preferred embodiment, the giftcard is provided in a form similar to that of a conventional credit card. Accordingly, the giftcard has a generally rectangular, plastic substrate with a magnetic strip for storing information. It will be appreciated that the precise shape of and materials used for the giftcard is not critical and, in fact, any type of device may be used. For example, the giftcard may be in the form of a key chain card having storage means affixed thereto, it may be in the form of a card with no storage media affixed thereto but merely with a card identification number affixed thereto, or it may simply be a paper receipt with an identification number printed thereon.

The steps for performing a giftcard sale in accordance with the teachings of the invention are shown in flowchart 400 at FIG. 4. Accordingly, as indicated with reference numeral 410, a retailer displays subscription giftcards for a publisher of periodicals. The giftcards may be enclosed in packaging to attract the attention of customers. Furthermore, the giftcards may be placed in a display fixture that may incorporate additional marketing artwork, such as signage. The giftcards are preferably positioned in a high traffic area of the store 20, such as near a front register.

A customer selects a giftcard and brings it to a POS terminal 210 for purchase. The customer may use any payment means accepted by the retailer to purchase the giftcard, as indicated with reference numeral 420. Once payment is received, the retailer activates the giftcard. The POS terminal 210 may include a card reader through which a giftcard with the appropriate magnetic strip may be swiped. Encoded on the giftcard may be a unique card identification number. Alternatively, the cashier may input the card identification number via the keyboard 244 or other input device. The POS terminal 210 forwards the card identification number for the giftcard to the store server 36, which updates the giftcard to active status. The store server 36 then forwards the active giftcard information to the publisher's computer 34 as indicated with reference numeral 430.

In addition to activating the giftcard, as indicated with reference numeral 440, the store server 36 may also calculate a share of revenue from the subscription giftcard sale as consideration for marketing and selling the giftcard. The retailer's share may be, for example, a fixed fee or a percentage of the dollar value of the giftcard.

Finally, as indicated with reference numeral 450, the retailer issues payment to the publisher as a result of the giftcard sale. Payment may be issued upon each giftcard sale or periodically (such as hourly) to reflect multiple giftcard sales. Payment may be made directly to the publisher, or may be made through an intermediary, for example, a payment processing center. Furthermore, the retailer's revenue share may be subtracted from the amount of the payment made to the publisher. In addition to the payment, the retailer may provide detailed reports to the publisher indicating the number of giftcards sold at specific value amounts, the total number of giftcards sold, and other sales information.

In the preferred embodiment, the giftcard may have a credit value, such as $10, $15, or $25. The credit value may be prominently displayed on the giftcard and associated packaging. The credit value may be associated with certain subscription deals, for example, a $10 card may offer 12 issues of a periodical, while a $15 card may offer 24 issues of the same periodical, or 6 issues of any two periodicals. Any number of subscription combinations may be reflected in the credit value, and are limited only by the imagination of marketing.

The card processor may pre-assign credit values according to card identification number, so that during giftcard activation, the appropriate credit value is reflected at the card processor. As a result, a customer may simply select a giftcard having a desired credit value and proceed to the register. During activation, as detailed above, the giftcard may be swiped through the card reader and a credit value corresponding to the desired amount is automatically activated.

In the alternative, the credit value may be assigned as the giftcard is being purchased. In this alternative, rather than pre-assigning a credit value to an inactive card, the, credit value is entered at the register before or after the giftcard is purchased. In this embodiment, the customer may be presented with a number of optional subscription deals, for example the choice of a years subscription to any four magazines for $25, and the retailer employee may enter the customer's desired value to the giftcard. The manually-entered credit value is forwarded to the store server 36 during activation.

In an additional embodiment, the giftcard is provided in the form of a smart card. Unlike the magnetic storage strips used in the credit card style giftcards, the smart card giftcards are embedded with a microprocessor and memory. As a result, information such as credit values may be stored and adjusted directly on the card. In the smart card embodiment, a smart card reader is used to store the desired credit value on the card when it is purchased and alternatively, when it is redeemed by the customer, as will be explained hereinafter.

It will further be appreciated that while the above embodiment discloses cards usable at a single publisher, the method may be used to sell giftcards of multiple publishers. In this embodiment, a set of giftcards is displayed for each publisher. The store server 36 may be programmed so that the card identification number directs the information to the appropriate publisher's computer 34, if more than one computer is used by the various publishers.

In accordance with additional aspects of the present invention, the retailer may sell a single, multi-publisher giftcard that may be used at a variety of publishers. In this embodiment, a consortium of publishers may be formed that will accept the multi-publisher giftcard as payment for subscriptions. Similar to the previous embodiments, the retailer displays the multi-publisher giftcards at one of its store locations. Any display fixtures and marketing artwork, as well as the giftcards themselves, may be clearly marked to indicate the participating publishers at which the giftcard may be used. The retailer receives payment for and activates the giftcard, forwarding active card information to a processor used by the multiple publisher consortium. The retailer may then calculate a revenue share from the sale of the giftcard, and issue payment to the multiple publisher consortium.

FIG. 5 illustrates a flowchart 500 showing some of the steps performed in fulfilling a subscription to a periodical that is purchased according to the technique described in FIG. 4. As indicated with reference numeral 510, once the customer's purchasing transaction is complete, the customer forwards the activated card identification number and the customer's subscription information (i.e., the customer's address information, etc.) to the publisher. The customer may forward the data in a number of different ways, including for example, by entering the information through an Internet website, by calling a customer service phone number and providing the information to an operator, or by sending the information to the publisher via regular mail, for example, by completing a subscription order form. It will be appreciated by those of ordinary skill in the art that the card information may be obtained in a variety of ways. For instance, if the customer wishes to enter the required information via an Internet webpage, the customer's subscription information may be entered by a traditional keyboard, while the card identification number may also be entered by a keyboard, or alternatively, by a card reader, in the event a magnetic card is issued, or by a smart card reader, in the event a smart card is issued. Furthermore, at the time the customer forwards the information to the publisher, the customer may make any choices required to fulfill the subscription, including any choices of specific periodicals, or subscription lengths.

The publisher, meanwhile, receives the activated giftcard identification number, and the appropriate payment from the retailer as indicated by the reference numeral 520. Once the publisher receives the correct information from both the retailer and the customer, the publisher may then use that information to verify the retailer's forwarded giftcard identification number with the customer's forwarded information as indicated with reference numeral 530. The publisher will thus be able to verify that the customer is eligible to receive the subscription deal purchased with the retailer. Upon verification of eligibility, the publisher may update the customer's information, i.e., correct mailing address, or credit value remaining, and fulfill the customer's paid subscription request as indicated with reference numeral 540.

Although the technique for providing customized subscription deals to periodicals as described herein is preferably implemented in software, it may be implemented in hardware, firmware, etc., and may be implemented by any other processor associated with the store and other facilities. Thus, the routine(s) described herein may be implemented in a standard multi-purpose CPU or on specifically designed hardware or firmware as desired. When implemented in software, the software routine(s) may be stored in any computer readable memory such as on a magnetic disk, a laser disk, or other storage medium, in a RAM or ROM of a computer or processor, etc. Likewise, the software may be delivered to a user or process control system via any known or desired delivery method including, for example, on a computer readable disk or other transportable computer storage mechanism or over a communication channel such as a telephone line, the Internet, etc. (which are viewed as being the same as or interchangeable with providing such software via transportable storage medium).

The invention has been described in terms of several preferred embodiments. It will be appreciated that the invention may otherwise be embodied without departing from the fair scope of the invention defined by the following claims.

What is claimed is:

1. A periodical subscription order system for processing a subscription order, the system comprising:
   a giftcard having a unique identifier;
   a point of sale terminal receiving the unique identifier and receiving a payment from a purchaser of the giftcard, the point of sale terminal coupling the unique identifier with data representative of the payment;
   a subscription database receiving and storing, from the point of sale terminal, the unique identifier and data representative of the payment; and
   a subscription ordering controller coupled to the subscription database, the subscription ordering controller comprising a processor and a memory operatively coupled to the processor, the subscription ordering controller programmed to allow a giftcard user to provide the unique identifier to the subscription ordering controller,
   the subscription ordering controller programmed to compare the unique identifier provided by the giftcard user with the unique identifier stored in the database,
   the subscription ordering controller programmed to allow the giftcard user to choose at least one subscription to a periodical from a plurality of periodicals provided by a single periodical publisher, each of the plurality of periodical subscriptions having an associated value,
   the subscription ordering controller programmed to determine whether the associated value of the chosen at least one periodical subscription is less than or equal to the value of the data representative of the payment; and
   the subscription ordering controller programmed to fulfill the at least one periodical subscription if the compared unique identifier provided by the giftcard user and the unique identifier stored in the database match, and if the associated value of the chosen at least one periodical subscription is less than or equal to the value of the data representative of the payment.

2. A periodical subscription order system of claim 1, wherein the giftcard user provides the unique identifier to the subscription ordering controller via the Internet.

3. A periodical subscription order system of claim 1, wherein the giftcard user provides the unique identifier to the subscription ordering controller via a telephonic interface.

4. A periodical subscription order system of claim 1, wherein the giftcard user provides the unique identifier to the subscription ordering controller via a mail-in subscription order form.

5. A periodical subscription order system of claim 1, wherein the giftcard comprises a smart card having a memory, the smart card memory storing the unique identifier.

6. A periodical subscription order system of claim 1, wherein the giftcard comprises a displayed credit value.

7. A periodical subscription order system of claim 1, wherein the subscription ordering controller updates the value of the data representative of the payment with data representative of a remaining subscription value, wherein the remaining subscription value is the difference between the associated value of the chosen at least one periodical subscription and the value of the data representative of the payment.

8. A periodical subscription order system for processing a subscription order, the system comprising:

a giftcard receiving a unique identifier;

a point of sale terminal assigning a unique identifier to the giftcard and receiving a payment from a purchaser of the giftcard, the point of sale terminal coupling the unique identifier with data representative of the payment;

a subscription database receiving and storing, from the point of sale terminal, the unique identifier and data representative of the payment; and a subscription ordering controller coupled to the subscription database, the subscription ordering controller comprising a processor and a memory operatively coupled to the processor, the subscription ordering controller programmed to allow a giftcard user to provide the unique identifier to the subscription ordering controller, the subscription ordering controller programmed to compare the unique identifier provided by the giftcard user with the unique identifier stored in the database, and the subscription ordering controller programmed to allow the giftcard user to choose at least one subscription to a periodical from a plurality of subscriptions to periodicals provided by a single periodical publisher, each of the plurality of periodical subscriptions having an associated value, the subscription ordering controller programmed to determine whether the associated value of the chosen at least one periodical subscription is less than or equal to the value of the data representative of the payment, and the subscription ordering controller programmed to fulfill the at least one periodical subscription if the compared unique identifier provided by the giftcard user and the unique identifier stored in the database match, wherein the associated value of the chosen at least one periodical subscription is less than or equal to the value of the data representative of the payment.

9. A periodical subscription order system of claim 8, wherein the giftcard user provides the unique identifier to the subscription ordering controller via the Internet.

10. A periodical subscription order system of claim 8, wherein the giftcard user provides the unique identifier to the subscription ordering controller via a telephonic interface.

11. A periodical subscription order system of claim 8, wherein the giftcard user provides the unique identifier to the subscription ordering controller via a mail-in subscription order form.

12. A periodical subscription order system of claim 8, wherein the giftcard comprises a smart card having a memory, the smart card memory receiving the unique identifier from the point-of-sale terminal and storing the unique identifier.

13. A periodical subscription order system of claim 8, wherein the giftcard comprises a programmable magnetic strip, the programmable magnetic strip receiving the unique identifier from the point-of-sale terminal and storing the unique identifier.

14. A periodical subscription order system of claim 8, wherein the subscription ordering controller updates the value of the data representative of the payment with data representative of a remaining subscription value, wherein the remaining subscription value is the difference between the associated value of the chosen at least one periodical subscription and the value of the data representative of the payment.

* * * * *